Oct. 8, 1946.   H. E. EDGERTON   2,408,764
HIGH-SPEED FLASH-PHOTOGRAPHY
Filed June 14, 1940   3 Sheets-Sheet 3

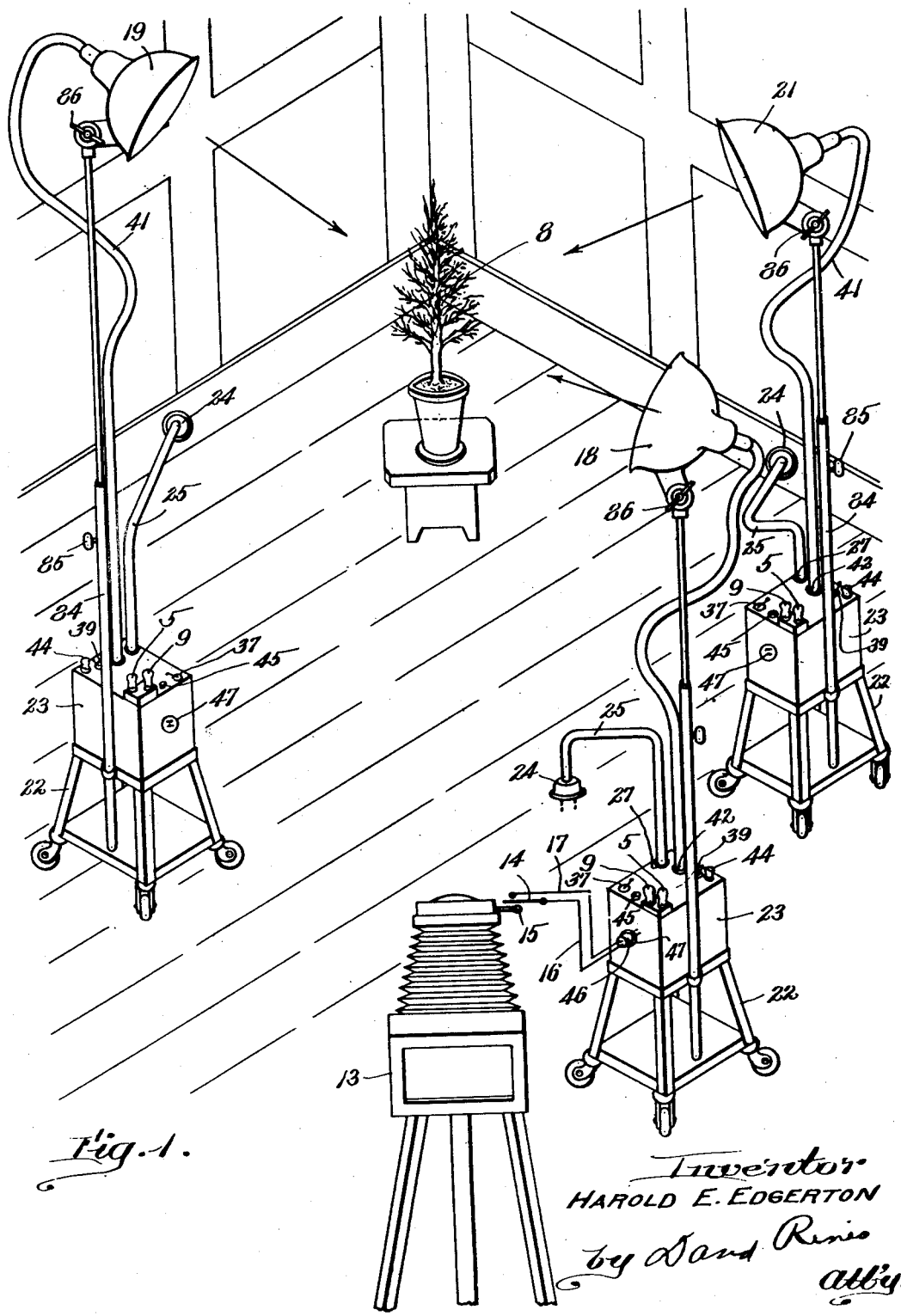

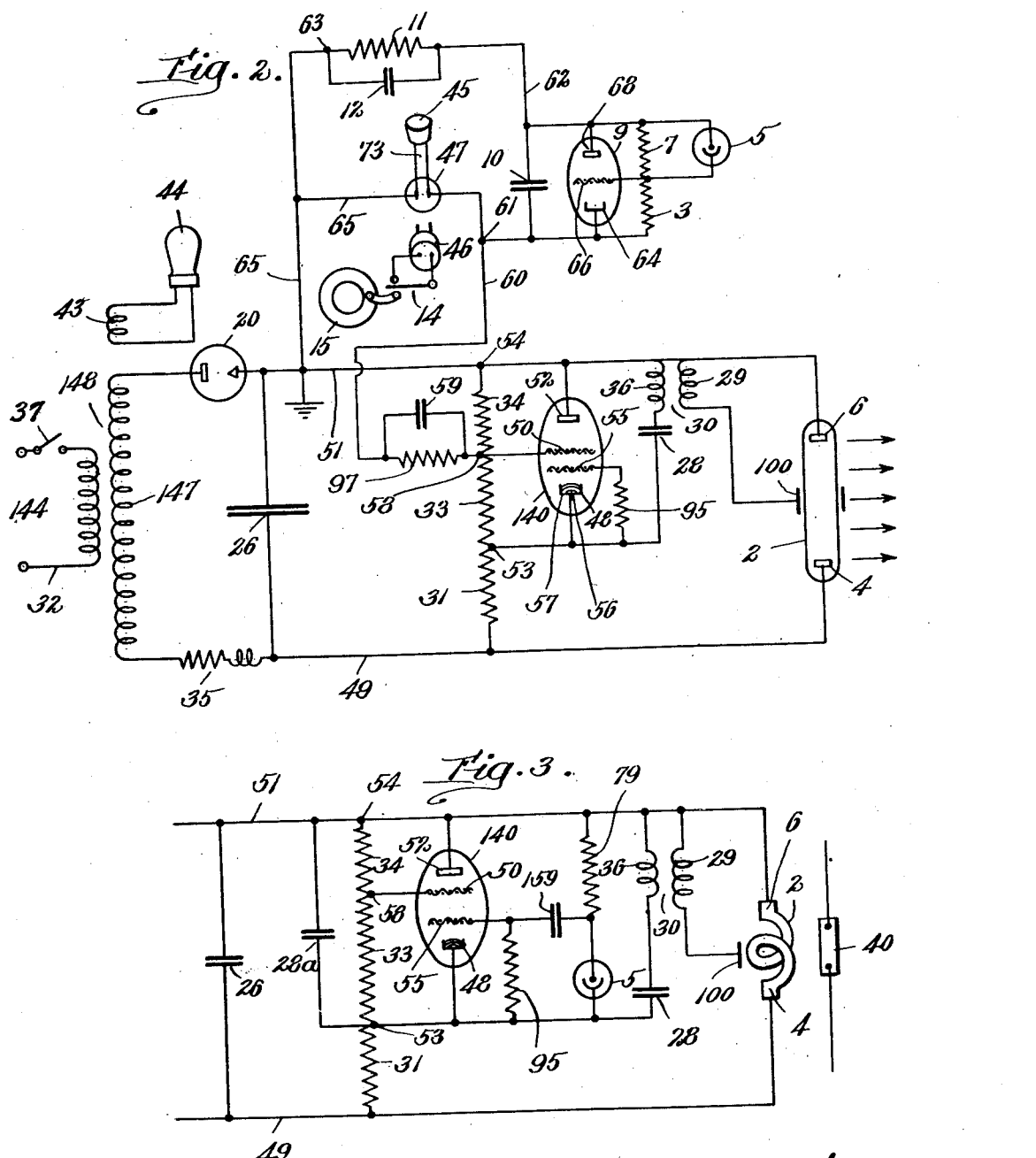

Inventor.
HAROLD E. EDGERTON
by David Rines
atty.

Patented Oct. 8, 1946

2,408,764

UNITED STATES PATENT OFFICE 2,408,764

HIGH-SPEED FLASH-PHOTOGRAPHY

Harold E. Edgerton, Belmont, Mass.

Application June 14, 1940, Serial No. 340,580

44 Claims. (Cl. 240—2)

The present invention relates to methods, systems and apparatus designed for flash-photography, and more particularly high-speed flash-photography such, for example, as are used to photograph large audiences and like scenes by artificial light.

It has heretofore been proposed to illuminate the object to be photographed with the aid of several widely spaced light sources located at different positions with respect to the object, and with the aid of electrical wiring between the light sources.

An object of the present invention, however, is to provide a flash-photography method and system of the above-described character that shall operate at high speed.

Other and further objects will be described hereinafter and will be particularly pointed out in the appended claims.

Figure 4:
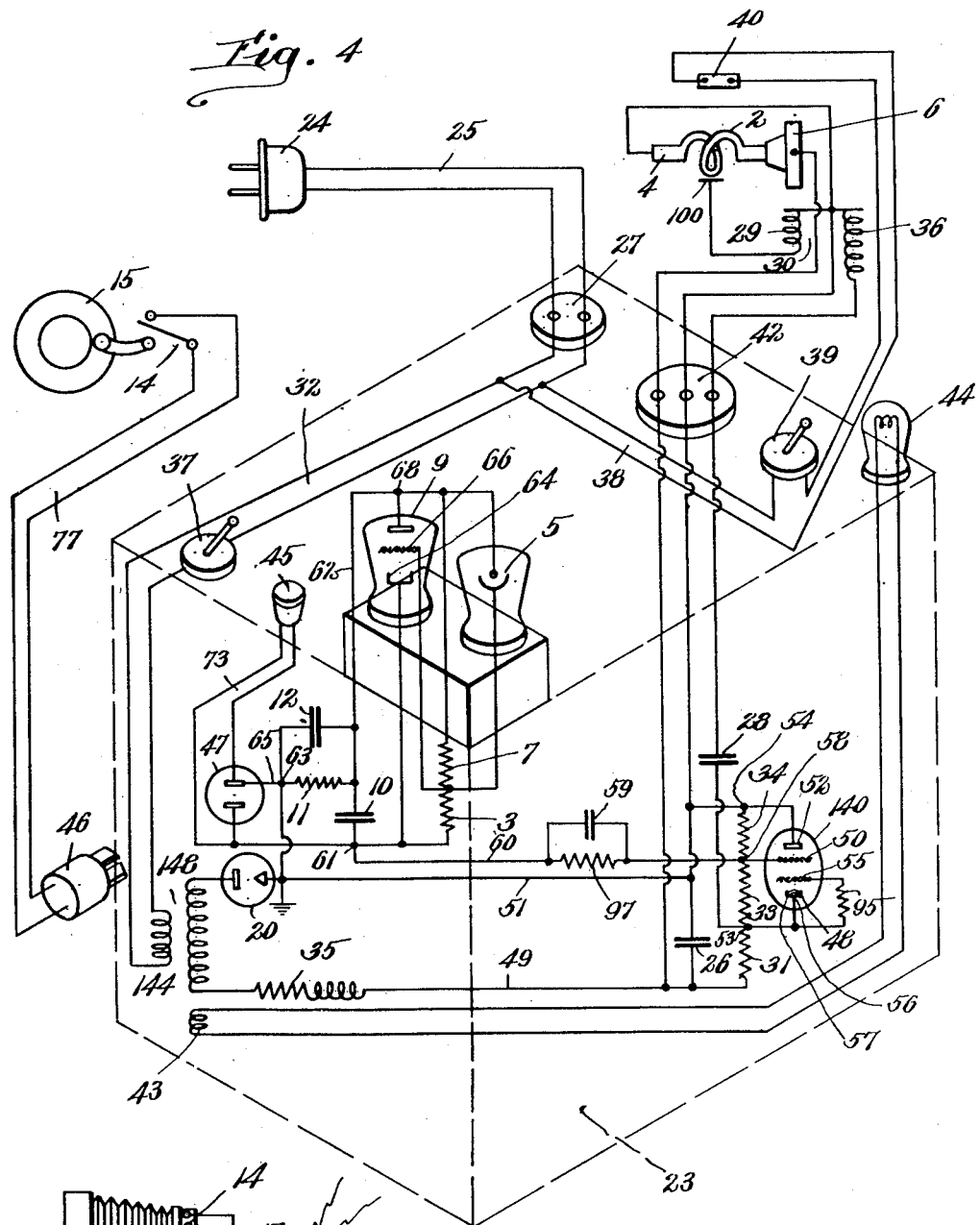
Figure 5:
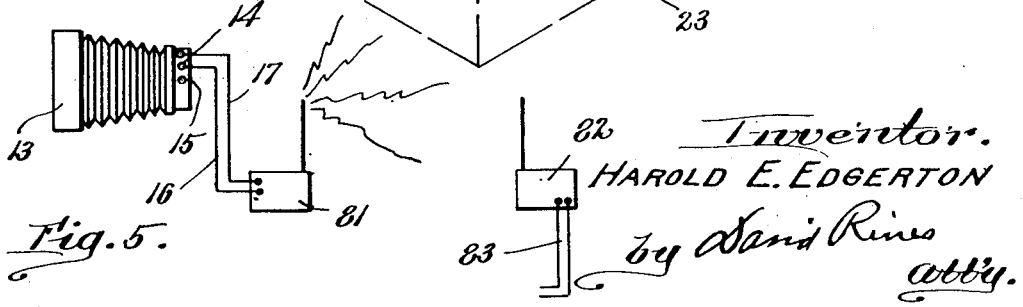

The invention will now be described more fully in connection with the accompanying drawings, in which Fig. 1 is a perspective of apparatus that may be used in the carrying out of the present invention; Fig. 2 is a circuit diagram that may be employed in practicing the invention, the focussing-lamp circuit and other circuits being omitted for clearness; Fig. 3 is a fragmentary modified circuit diagram; Fig. 4 is a diagrammatic perspective of preferred apparatus, shown by dashed lines, with circuit connections thereto; and Fig. 5 is a diagram of a further modification.

A plurality of normally unenergized electric-flash-lamp reflector units are shown in Fig. 1 widely spaced in various parts of a room, at a substantial distance from one another, in order that they may be focussed upon an object 8 to be photographed with the aid of a camera 13. The object 8 is shown as a potted plant, but it may be a large audience or a like scene illuminated by artificial light. Each lamp comprises a flashing tube 2. A camera-shutter-synchronization switch 14, operated from the camera shutter 15 in response to the opening thereof, is connected by wire conductors 16 and 17 to one lamp unit 18 only. The lamp 2 of the unit 18 may be referred to as the master-light source, preliminarily located to illuminate one portion of the scene. Upon the closing of the switch 14, through manipulation of the shutter 15, the master-light-source unit 18 will produce a flash. The master-light source 18 may therefore be illuminated at will.

Other units, two of which are shown at 19 and 21, and which may be preliminarily located in position for illuminating another desired portion of the scene, will thereupon be energized to flash in response to the flashing of the unit 18, since they are controllable by light from the master-light source 18. The lamps of these other units may be referred to as slave-light sources, since they are located in positions for receiving light from the master-light source.

According to the preferred embodiment of the invention, this result is attained by providing each of the units 18, 19 and 21 with some photosensitive element, such as a photo-electric cell 5, each cell 5 being connected to initiate the flash of the particular unit with which it is associated. Irrespective of which unit 18, 19 or 21 may be connected directly to the switch 14, therefore, the photo-electric cells 5 of the other units will respond immediately to the light of the flash produced by that unit to flash the other units also. The lamps must be so positioned, of course, that a flash from one of the lamps shall be directed upon the photo-electric cells 5 of the other lamps as well as upon the object 8, though this may be effected by reflected light as well as directly. The difference in time between the flash of the first unit to flash and the responsive flashes of the other units may be made of the order of $1/10,000$ of a second, or less. This it is possible to accomplish because the photographically effective peaks of illumination of the flash-lamps have a time duration of this very small order.

For practical purposes, this time difference is so small that the flashes are, in effect, simultaneous; the photographically effective peaks of illumination of the later lamps to flash occur during the very small time duration of the first lamp to flash. The resulting photograph of the object 8 is the same as though the lamp units 18, 19 and 21 do, indeed, flash instantaneously, in actual rigorous and precise synchronism; the lamps all flash together in unison at a time when the shutter still remains open, for the time of shutter opening of commercial high-speed shutters is about $1/400$ of a second; and this permits of all the light of the flashes to be utilized on the camera film before the shutter closes.

The switch 14 and the photo-electric cells 5 are all independent of one another, but the cells 5 all respond to the flash of light produced when the switch 14 becomes closed.

The switch 14, when closed, thus serves to flash one tube 2 in synchronism with the camera shutter 15 at the instant that the shutter 15 is opened. The sensitized photographic surface thereupon becomes uncovered to the scene to be photographed simultaneously with the illumination of the scene by the master-light source and the slave-light source. All the tubes 2 will flash together, due to the photo-electric-cell trip units 5, the energy received by which from the first tube 2 to flash will be amplified by relay amplifying tubes 9, as hereinafter explained.

The lamp units 18, 19 and 21 are each shown supported upon a rod 84 that is mounted upon a portable stand 22 that carries also a box in which is enclosed most of the circuit apparatus and upon the upper surface of which is mounted the photo-electric cell 5. The lamp units are telescopically adjusted vertically and rotatably upon the rods 84 and may be clamped in vertically and rotatably adjusted position by clamp nuts 85. Pivotal adjustment of each unit upon the rod 84 may be effected about a pivot 86. Connection is made to a power source by means of an input plug 24, a separate such plug 24 being provided for each unit. The plug 24 is connected to circuits in the box 23 by a cable, the conducting wires 25 of which enter the upper surface of the box at 27. If the source of power is alternating, as is the case with the ordinary 110-volt alternating-current mains, the plug 24 may be connected, by the wires 25 and further wires 32 (see Figs. 2 and 4), through a hand power switch 37, on the upper surface of the box 23, to the primary winding 144 of a transformer 148, the secondary winding 147 of which is connected, through a rectifier 20, and a charging impedance 35, which may be constituted of inductance or resistance, or both, to a condenser 26. A rectified or direct-current source 148, 20 is thus provided for charging the condenser 26 to a voltage, say of 2,000 volts.

The plug 24 is connected by the wires 25 and wires 38 (Fig. 4), in parallel to the wires 32, through a hand switch 39 on the upper surface of the box 23 (Figs. 1 and 4), to a focussing lamp 40. Each reflector unit 18, 19 and 21 is provided with one of these focussing lamps 40 in addition to the flashing lamp, and the wires 38 therefor are contained in the same cable 41 as the wires for the flashing lamp, which last-named wires extend from the box 23 at 42. The focussing lamp 40 may be of the type illustrated and described in Letters Patent 2,277,697, issued March 31, 1942, to Herbert E. Grier, but other focussing lamps may be employed. The function of the focussing lamp 40 is to provide weak continuous light for lining up the reflector and focussing the camera prior to operating the flash lamp for producing the exposure.

The transformer 148 is provided with a further secondary winding 43 (Figs 2 and 4) for supplying energy to a signal pilot lamp 44, also provided on the upper surface of the box 23. The signal lamp 44, therefore, becomes illuminated upon the closing of the hand switch 37, thus indicating that the condenser 26 is connected to its source of energy. The box 23 carries, also, on its upper surface, a hand-controlled trip switch 45 for operating the flash lamp by discharging the condenser 26 when the preliminary adjustments have all been completed. The trip switch 45 is connected in parallel with the camera shutter synchronization switch 14, when the plug 46 has been inserted into a socket 47 carried on a side of the box 23. Either the trip switch 45 or the camera switch 14 or any other set of contacts plugged into the socket 47, as well as the photo-electric cell 5, will control the instant of flash of the flash lamp 2. On the upper surface of each box 23 is mounted also a relay amplifier tube 9. Further electrical apparatus and wiring, hereinafter to be described, is contained inside the box 23.

The flash-lamp 2 may have any desired form, for providing an intense flash of light. In Fig. 2, it is shown in the form of a straight tube, but in Figs. 3 and 4, it is shown of the coiled-tube type. It may contain krypton, argon, neon or any other suitable gas or mixtures of gases. It is provided with two terminals, constituted of a cathode 6 and an anode 4, connected by conductors 49 and 51, contained in the cable 41, to the condenser 26 and a trigger starting or control electrode 100.

The condenser 26 is connected by the conductors 49 and 51 also to a bleeder resistor 33, 34 in series with a bleeder resistor 31, in parallel with the tube 2. The circuit associated with the tube 2 for energizing the tube 2 is normally ineffective, as the tube 2 is normally non-conducting, but the condenser 26 will discharge through the tube 2 when the normally ineffective amplifier 9 becomes momentarily effective, or when the switch 14 becomes closed. A trigger tube 140 may be connected to a terminal 53 and a grounded terminal 54, at the ends of the bleeder resistor 33, 34, so as to be supplied with voltage therefrom. These resistors are so proportioned that a desired voltage of, say, 300 volts shall appear across the terminals 53 and 54. To the terminals 53 and 54 there are also connected, in series with a condenser 28, a primary winding 36 of a transformer 30, which may be constituted of a well known spark coil. The secondary winding 29 of the transformer 30 is connected to the anode 6 and the trigger control electrode 100.

The trigger tube 140 may be a thyratron, as described in United States Letters Patent 2,181,879, issued December 5, 1939, or it may be of the type that is disclosed, for example, in Letters Patent 2,185,189, issued January 2, 1940, to Kenneth J. Germeshausen. It may comprise an evacuated glass envelope filled with a suitable gas, such as neon, and is provided with a plurality of electrodes, namely, a solid cathode 48, an anode or plate 52, and one or more grids, inner and outer grids being shown at 55 and 50, between the cathode 48 and the anode 50. An impedance 95 is connected between the cathode 48 and the grid 55, and the resistor 33 is connected between the cathode 48 and the grid 50, between the terminal 53 and a terminal 58.

As described in the said Letters Patent 2,185,189, the cathode 48 may comprise a metal cup containing a pill 56 constituted of a mixture of materials that can react chemically to produce a substance of relatively low work-function, such as caesium chloride and aluminum filings. The pill 56 is held in place by a wire-mesh screen 57. The source of the electrons is a bright cathode spot on the surface of the pill 56.

The amplifier tube 9 may be of the three-element, gas-filled type, such as is obtainable in the market under the designation OA4G, provided with a cathode 64, a control electrode or grid 66 and an anode 68. It may also, like the tube 140, however, be of the type disclosed in the said Letters Patent 2,185,189. The tube 9 may also be a vacuum tube, with a heated cathode. The amplifier 9 is normally non-effective, but may be rendered effective by the action of the photocell 5, in response to the light from a flash. Upon becoming thus rendered effective, it renders momentarily effective the normally non-effective circuit of the tube 140, to permit the condenser 26 to discharge through the tube 2, thereby to effect the momentary flashing of the tube 2. Promptly thereafter, the circuit becomes ineffective once more, thus automatically extinguishing the lamp. This operation results in very rapid flashing, for the lamp becomes extinguished promptly after it flashes.

An impedance 3 is connected between the cathode 64 and the control electrode 66 and an impedance 7 between the control electrode 66 and the anode 68. The impedances 3 and 7 may be resistors. The photo-electric cell 5 is also shown connected between the control electrode 66 and the anode 68, in parallel with the impedance 7. A condenser 10 is connected between the cathode 64 and the anode 68 so as to discharge through the tube 9 in response to the action of the photo-electric cell 5.

The flash-lamp 2 of any unit, as before stated, may be tripped by the switch 14, the switch 45, or the photo-electric cell 5. If tripped by the switch 14, in response to the action of the camera shutter 15, then the flash-lamps 2 of the other units will be tripped by the action of the photo-electric cells 5 of those units in response to the flash, as before described. The switch 14 and the photo-electric cell, therefore, are both connected across the terminals 54 and 58, respectively connected to the anode 52 and the grid 50 of the tube 140.

The circuit may be traced from the terminal 58, connected to the grid 50, through a blocking condenser 59 and a leak resistor 97, in parallel, by way of a conductor 60, to a terminal 61. The circuit continues through the tube 9 and the resistors 3 and 7, by way of a conductor 62, through a blocking condenser 12 and a leak resistor 11, in parallel to a terminal 63. From the terminal 63, the circuit continues, by way of a conductor 65 and the conductor 51, to the grounded terminal 54, which is connected to the anode 52.

The photo-electric cell 5 is enabled to trip this circuit by reason of its connection between the grid 66 and the anode 68, in parallel to the resistor 7. The switch 14 is enabled to trip this circuit by reason of the fact that the socket 47, to which the switches 14 and 45 are connected in parallel, by conductors 77 and 73, respectively is connected between the conductors 60 and 65. The photo-electric cell 5 and the switch 14 are thus each enabled to trip the tube 2 by reason of their connection to the grid 50 of the tube 140, which controls the tripping transformer 30.

The control by means of the photo-electric cell 5 is effected at the moment that a flash of light from another unit strikes the cathode thereof, effecting a change of potential on the grid 66 of the relay tube 9. The tube 9, which is normally non-conducting, becomes thereupon conducting, causing a sudden surge to become impressed upon the grid 50 of the tube 140.

In operation, the condenser 26 starts to become charged from the direct-current source 148, 20, the tube 140 being non-conductive. The source 148, 20 charges the condenser 28 at the same time at a slow rate, through the resistor 31 and the primary winding 36. At any time after the voltage across the condenser 10 reaches its maximum value, the switch 14 of one unit or the photo-electric cells 5 of the other units may be caused to function, raising the potential of the grid 50 until the break-down voltage between the grid 50 and the cathode 48 is exceeded, and the trigger tube 140 becomes conducting. The condenser 28 then discharges through the condenser-discharge circuit comprising the tube 140 and the primary winding 36 of the transformer 30. The resulting high-voltage surge of the secondary winding 29 of the transformer 30 is applied to the trigger electrode 100 of the tube 2. This causes the gas in the tube 2 to ionize, permitting the condenser 26 to discharge through the flash lamp 2 between its electrodes, producing a very brilliant flash of short duration. When the condenser 26 is fully discharged, the tube promptly extinguishes and the cycle is ready for repetition.

When the condenser 26 is fully discharged, the voltage across the resistors 33, 34 is zero, preventing the condenser 28 from charging again and allowing the tube to deionize. The time taken for the circuit to function from the closing of the switch 14 or the operation of the photo-electric cell 5 to the flash of light from the tube 2 is very brief.

According to the modification of Fig. 3, the tube 9 may be omitted. The photo-electric cell 5 is connected, through a capacitor 159, to the grid 55 of the tube 140, an impedance 79 is connected between the grid 55 and the anode 52, and a condenser 28a is connected across the resistors 33 and 34. The trip condenser 28 is connected in series with the trip transformer 30. This simplicity of connection is obtained, however, at the expense of some degree of sensitivity. Higher sensitivity than that obtained with the system of Fig. 2, on the other hand, may be attained by the use of more sensitive amplifier tubes or circuit adjustments. The amplifier is made more or less sensitive, so that the flash of light from the first tube 2 to flash shall operate the other lamps 2, but so that dimmer flashes from other sources shall not cause any of the lamps 2 to operate at undesired times.

The photo-electric cell and amplifier arrangement for use in the present invention may be of any conventional type such as are in extensive use today. The only requirement is that the pick-up action must be rapid and the signal not delayed by the amplifier or photo-electric cell.

The invention is not restricted to use with photo-electric cells. In Fig. 5, for example, the camera shutter 15 is shown setting into operation a flash-lamp unit 81 adapted, at will, to transmit radio waves that may be received by radio receivers preliminarily distributed about the scene, one of which receivers is illustrated at 82. The radiation source 81 here performs the function of the master unit 18 before described, and the radio receivers 82 are controllable by radiation from the radiation source 81. Each radio receiver 82 may be connected by wires 83 to the grid 50 or some other portion of the grid circuit of a gas-filled trigger tube 140 for controlling the flashing of the tube 2.

Further modifications will occur to persons skilled in the art and all such are considered to fall within the spirit and scope of the invention, as defined in the appended claims.

What is claimed is:

1. Apparatus of the character described for photographing an object having, in combination, a plurality of widely spaced normally unenergized flash lamps for producing flashes to illuminate the object, a camera having a shutter, means controlled by the shutter for flashing one of the lamps, and means responsive to the flash produced by the said one lamp for flashing another lamp.

2. Apparatus of the character described for photographing an object having, in combination, a plurality of flash-lamps for producing flashes to illuminate the object, a camera having a shutter, a plurality of means, one associated with each of a plurality of the lamps, and individually controllable by the shutter to flash the respective lamps selectively, and means for thereupon flashing the other lamps.

3. Apparatus of the character described for photographing an object having, in combination, a plurality of flash-lamps for producing flashes to illuminate the object, a camera having a shutter, a plurality of means, one associated with each of a plurality of the lamps, and individually controllable by the shutter to flash the respective lamps selectively, and photosensitive means, one associated with each of the other lamps, for flashing the said other lamps.

4. Apparatus of the character described for photographing an object having, in combination, a plurality of widely spaced flash-lamps that are unconnected by electric wiring for producing flashes to illuminate the object, a camera having a shutter, means controlled by the shutter for flashing one of the lamps, and means controlled by the flashing of the said one lamp for flashing the other lamps.

5. Apparatus of the character described for photographing an object having, in combination, a plurality of widely spaced flash-lamps that are unconnected by electric wiring for producing flashes to illuminate the object, a camera having a shutter, means controlled by the shutter for flashing one of the lamps, and photosensitive means controlled by the flashing of the said one lamp for flashing the other lamps.

6. Apparatus of the character described for photographing an object having, in combination, a plurality of flash-lamps positioned at a substantial distance from one another in order that they may produce flashes upon the object from substantially different directions, a camera having a shutter, means controlled by the shutter for flashing one of the lamps, and photosensitive means associated with another lamp and responsive to the flash produced by the said one lamp for flashing the said other lamp.

7. Apparatus of the character described for photographing an object having, in combination, a plurality of flash-lamps positioned at a substantial distance from one another in order that they may produce flashes upon the object from substantially different directions, a plurality of normally ineffective circuits respectively associated with the respective lamps for respectively energizing the respective lamps, a camera having a shutter, means controlled by the shutter for rendering one of the circuits effective to cause the lamp associated therewith to produce a flash, and photosensitive means associated with another lamp and responsive to the flash produced by the said one lamp for rendering another circuit effective to cause the said other lamp to produce a flash.

8. Apparatus of the character described having, in combination, a support, a normally unenergized gaseous-discharge flash-lamp carried by the support, means carried by the support for connecting the lamp to a source of power, a camera having a shutter means controlled by the shutter for energizing the lamp to flash it, means for extinguishing the lamp promptly after it has flashed, and means carried by the support for flashing the lamp in response to illumination from an external source.

9. Apparatus of the character described having, in combination, a plurality of normally unenergized flash-lamps each provided with a cathode and an anode between which current may be caused to flow when the respective flash-lamps are energized, thereby to render the respective flash-lamps luminescent, a plurality of normally ineffective circuits respectively associated with the respective flash-lamps and respectively operable when effective to energize the respective flash-lamps to cause current to flow between the cathodes and the anodes thereof, means for rendering the circuit associated with one of the flash-lamps effective, means for automatically rendering the said circuit ineffective promptly after the said one flash-lamp becomes luminescent promptly to extinguish the said one flash-lamp, whereby the said one flash-lamp becomes luminescent momentarily only to produce a flash, means responsive to the flash produced by the said one flash-lamp for rendering the circuit associated with another flash-lamp effective, and means for automatically rendering the said circuit associated with the said other flash-lamp ineffective promptly after the said other flash-lamp becomes luminescent promptly to extinguish the said other flash-lamp, whereby the said other flash-lamp becomes luminescent momentarily only to produce a flash substantially simultaneously with the flash produced by the said one flash-lamp.

10. Apparatus of the character described for photographing an object having, in combination, a master-light source for illuminating the object, a slave-light source for illuminating the object, means for illuminating the master-light source, photosensitive means for illuminating the slave-light source with the illumination of the master-light source, and means for exposing a sensitized photographic surface simultaneously with the illumination of the object by the master-light source and the slave-light source.

11. Apparatus of the character described having, in combination, a plurality of normally unenergized flash-lamps each provided with a cathode and an anode between which current may be caused to flow when the respective flash-lamps are energized, thereby to render the respective flash-lamps luminescent, a plurality of normally ineffective circuits respectively associated with the respective flash-lamps and respectively operable when effective to energize the respective flash-lamps to cause current to flow between the cathodes and the anodes thereof, a normally ineffective discharge device operative when effective to render the circuit associated with one of the flash-lamps effective, means for rendering the discharge device effective, means for automatically rendering the said circuit ineffective promptly after the said one flash-lamp becomes luminescent promptly to extinguish the said one flash-lamp, whereby the said one flash-lamp becomes luminescent momentarily only to produce a flash, a second normally ineffective discharge device operative when effective to render the circuit associated with another flash-lamp effective, means responsive to the flash produced by the said one flash-lamp for rendering the second discharge device effective, and means for automatically rendering the said circuit associated with the said other flash-lamp ineffective promptly after the said other flash-lamp becomes luminescent promptly to extinguish the said other flash-lamp, whereby the said other flash-lamp becomes luminescent momentarily only to produce a flash substantially simultaneously with the flash produced by the said one flash-lamp.

12. Apparatus of the character described having, in combination, a plurality of normally unenergized flash-lamps each provided with a cathode and an anode between which current may be caused to flow when the respective flash-lamps are energized, thereby to render the respective flash-lamps luminescent, a plurality of normally ineffective circuits respectively associated with the respective flash-lamps and respectively operable when effective to energize the respective flash-lamps to cause current to flow between the cathodes and the anodes thereof, means for rendering the circuit associated with one of the flash-lamps effective, means for automatically rendering the said circuit ineffective promptly after the said one flash-lamp becomes luminescent promptly to extinguish the said one flash-lamp, whereby the said one flash-lamp becomes luminescent momentarily only to produce a flash, inertia-less means responsive to the flash produced by the said one flash-lamp for rendering the circuit associated with another flash-lamp effective, and means for automatically rendering the said circuit associated with the said other flash-lamp ineffective promptly after the said other flash-lamp becomes luminescent promptly to extinguish the said other flash-lamp, whereby the said other flash-lamp becomes luminescent momentarily only to produce a flash substantially simultaneously with the flash produced by the said one flash-lamp.

13. Apparatus of the character described having, in combination, a unit having a normally unenergized flash-lamp provided with a cathode and an anode between which current may be caused to flow when the flash-lamp is energized, thereby to render the flash-lamp luminescent, the flash-lamp having also a normally unenergized triggering electrode that may be energized to energize the lamp, the unit having a normally ineffective circuit associated with the flash-lamp and operable when effective to energize the electrode to cause current to flow between the cathode and the anode of the flash-lamp, the unit having a switch for rendering the circuit effective to energize the electrode, the unit having also photosensitive means operable independently of the switch in response to light rays to energize the electrode to render the circuit effective, and the unit having means for automatically rendering the circuit ineffective, thereby deenergizing the electrode, promptly after the flash-lamp becomes luminescent promptly to extinguish the flash-lamp, whereby the flash-lamp becomes luminescent momentarily only to produce a flash.

14. Apparatus of the character described having, in combination, a unit having a normally unenergized flash-lamp provided with a cathode and an anode between which current may be caused to flow when the flash-lamp is energized, thereby to render the flash-lamp luminescent, the unit having a normally ineffective circuit associated with the flash-lamp and operable when effective to energize the flash-lamp to cause current to flow between the cathode and the anode thereof, the unit having a switch for rendering the circuit effective, the unit having also photosensitive means operable independently of the switch in response to light rays to render the circuit effective, and the unit having means for automatically rendering the circuit ineffective promptly after the flash-lamp becomes luminescent promptly to extinguish the flash-lamp, whereby the flash-lamp becomes luminescent momentarily only to produce a flash.

15. Apparatus of the character described having, in combination, a plurality of units each having a normally unenergized flash-lamp provided with a cathode and an anode between which current may be caused to flow when the respective flash-lamps are energized, thereby to render the respective flash-lamps luminescent, a plurality of normally ineffective circuits respectively associated with the respective units and respectively operable when effective to energize the flash-lamps of the respective units to cause current to flow between the cathodes and the anodes thereof, each unit having a switch for rendering its circuit effective and having also photosensitive means operable independently of its switch in response to light rays from the flash-lamp of another unit to render its circuit effective, and each unit having means for automatically rendering its circuit ineffective promptly after its flash-lamp becomes luminescent promptly to extinguish its flash-lamp.

16. Apparatus of the character described for photographing an object having, in combination, a plurality of widely spaced normally unenergized flash-lamps for producing flashes to illuminate the object, each flash-lamp being provided with a cathode and an anode between which current may be caused to flow when the respective flash-lamps are energized, thereby to render the respective flash-lamps luminescent, a plurality of normally ineffective circuits respectively associated with the respective flash-lamps and respectively operable when effective to energize the respective flash-lamps to cause current to flow between the cathodes and the anodes thereof, a normally ineffective camera, means for rendering the camera effective and for rendering the circuit associated with one of the flash-lamps effective, means for automatically rendering the said circuit ineffective promptly after the said one flash-lamp becomes luminescent promptly to extinguish the said one flash-lamp, whereby the said one flash-lamp becomes luminescent momentarily only to produce a flash, means responsive to the flash produced by the said one flash-lamp for rendering the circuit associated with another flash-lamp effective, and means for automatically rendering the said circuit associated with the said other flash-lamp ineffective promptly after the said other flash-lamp becomes luminescent promptly to extinguish the said other flash-lamp, whereby the said other flash-lamp becomes luminescent momentarily only to produce a flash substantially simultaneously with the flash produced by the said one flash-lamp.

17. Apparatus of the character described for photographing an object having, in combination, a plurality of widely spaced normally unenergized flash-lamps for producing flashes to illuminate the object, each flash-lamp being provided with a cathode and an anode between which current may be caused to flow when the respective flash-lamps are energized, thereby to render the respective flash-lamps luminescent, a plurality of normally ineffective circuits respectively associated with the respective flash-lamps and respectively operable when effective to energize the respective flash-lamps to cause current to flow between the cathodes and the anodes thereof, a camera having a shutter, means for operating the shutter and rendering the circuit associated with one of the flash-lamps effective, means for automatically rendering the said circuit ineffective promptly after the said one flash-lamp becomes luminescent promptly to extinguish the said one flash-lamp, whereby the said one flash-lamp becomes luminescent momentarily only to produce a flash, means responsive to the flash produced by the said one flash-lamp for rendering the circuit associated with another flash-lamp effective, and means for automatically rendering the said circuit associated with the said other flash-lamp ineffective promptly after the said other flash-lamp becomes luminescent promptly to extinguish the said other flash-lamp, whereby the said other flash-lamp becomes luminescent momentarily only to produce a flash substantially simultaneously with the flash produced by the said one flash-lamp.

18. Apparatus of the character described having, in combination, a plurality of normally unenergized flash-lamps, means for storing electric energy, means for charging the energy-storing means to store energy therein, means for effecting a discharge of the stored energy through one of the lamps to energize the said one lamp, thereby to cause the said one lamp to produce a flash, and means responsive to the flash produced by the said one lamp for effecting a discharge of the stored energy through another lamp to energize the said other lamp, thereby to cause the said other lamp to produce a flash.

19. Apparatus of the character described having, in combination, a plurality of normally unenergized flash-lamps of a type that, when successively energized momentarily, will produce flashes, each having a photographically effective peak of illumination of very small time duration followed by prompt extinguishment, means for momentarily energizing one of the lamps to cause the said one lamp to produce a flash, means responsive to the flash produced by the said one lamp for momentarily energizing another lamp to cause the said other lamp to produce a flash, and means whereby the peak of illumination of the flash of the said other lamp is caused to occur during the very small time duration of the peak of illumination of the flash of the said one lamp.

20. Apparatus of the character described having, in combination, a plurality of normally unenergized flash-lamps of a type that, when successively energized momentarily, will produce flashes, each having a photographically effective peak of illumination of very small time duration followed by prompt extinguishment, means for momentarily energizing one of the lamps to cause the said one lamp to produce a flash, photosensitive means responsive to the flash produced by the said one lamp for momentarily energizing another lamp to cause the said other lamp to produce a flash, and means whereby the peak of illumination of the flash of the said other lamp is caused to occur during the very small time duration of the peak of illumination of the flash of the said one lamp.

21. Apparatus of the character described having, in combination, a plurality of normally unenergized flash-lamps of a type that, when successively energized momentarily, will produce flashes each having a photographically effective peak of illumination of very small time duration followed by prompt extinguishment, a first normally ineffective circuit for energizing one of the lamps when rendered effective, a second normally ineffective circuit for energizing another lamp when rendered effective, means for rendering the first circuit momentarily effective to cause the said one lamp to produce a flash, means responsive to the flash produced by the said one lamp for momentarily rendering the second circuit effective to cause the said other lamp to produce a flash, and means whereby the peak of illumination of the flash of the said other lamp is caused to occur during the very small time duration of the peak of illumination of the flash of the said one lamp.

22. Apparatus of the character described having, in combination, a plurality of normally unenergized flash-lamps of a type that, when successively energized momentarily, will produce flashes each having a photographically effective peak of illumination of very small time duration followed by prompt extinguishment, a first normally ineffective circuit for energizing one of the lamps when rendered effective, a second normally ineffective circuit for energizing another lamp when rendered effective, means for rendering the first circuit momentarily effective to cause the said one lamp to produce a flash, an amplifier connected with the second circuit, means responsive to the flash produced by the said one lamp and operable through the amplifier for momentarily rendering the second circuit effective to cause the said other lamp to produce a flash, and means whereby the peak of illumination of the flash of the said other lamp is caused to occur during the very small time duration of the peak of illumination of the flash of the said one lamp.

23. Apparatus of the character described having, in combination, a plurality of normally unenergized flash-lamps of a type that, when successively energized momentarily, will produce flashes each having a photographically effective peak of illumination of very small time duration followed by prompt extinguishment, a first normally ineffective circuit for energizing one of the lamps when rendered effective, a second normally ineffective circuit for energizing another lamp when rendered effective, means for rendering the first circuit momentarily effective to cause the said one lamp to produce a flash, photosensitive means responsive to the flash produced by the said one lamp for rendering the second circuit momentarily effective to cause the said other lamp to produce a flash, and means whereby the peak of illumination of the flash of the said other lamp is caused to occur during the very small time duration of the peak of illumination of the flash of the said one lamp.

24. Apparatus of the character described having, in combination, a plurality of normally unenergized flash-lamps of a type that, when successively energized momentarily, will produce flashes each having a photographically effective peak of illumination of very small time duration followed by prompt extinguishment, a first normally ineffective circuit for energizing one of the lamps when rendered effective, a second normally ineffective circuit for energizing another lamp when rendered effective, means for rendering the first circuit momentarily effective to cause the said one lamp to produce a flash, inertia-less means responsive to the flash produced by the said one lamp for rendering the second circuit momentarily effective to cause the said other lamp to produce a flash, and means whereby the peak of illumination of the flash of the said other lamp is caused to occur during the very small time duration of the peak of illumination of the flash of the said one lamp.

25. Apparatus operable with a normally ineffective camera for photographing an object having, in combination, a plurality of normally unenergized flash-lamps for producing flashes when momentarily energized to illuminate the object, the lamps being of a type such that the flashes produced thereby each has a photographically effective peak of illumination of very small time duration followed by prompt extinguishment, means for rendering the camera momentarily effective and for thereafter promptly rendering it ineffective, means for momentarily energizing one of the lamps with the rendering effective of the camera to cause the said one lamp to produce a flash having its peak of illumination at a time before the camera is rendered ineffective, means responsive to the flash produced by the said one lamp for momentarily energizing another lamp to cause the said other lamp to produce a flash, and means whereby the peak of illumination of the flash of the said other lamp is caused to occur before the camera becomes rendered ineffective during the very small time duration of the peak of illumination of the flash of the said one lamp.

26. Apparatus operable with a camera having a normally closed shutter for photographing an object having, in combination, a plurality of normally unenergized flash-lamps for producing flashes when momentarily energized to illuminate the object, the lamps being of a type such that the flashes produced thereby each has a photographically effective peak of illumination of very small time duration followed by prompt extinguishment, means for opening the shutter and momentarily energizing one of the lamps to cause the said one lamp to produce a flash having its peak of illumination at a time before the shutter becomes closed, means responsive to the flash produced by the said one lamp for momentarily energizing another lamp to cause the said other lamp to produce a flash, and means whereby the peak of illumination of the flash of the said other lamp is caused to occur before the shutter becomes closed during the very small time duration of the peak of illumination of the flash of the said one lamp.

27. Apparatus operable with a camera having a normally closed shutter for photographing an object having, in combination, a plurality of normally unenergized flash-lamps for producing flashes when momentarily energized to illuminate the object, the lamps being of a type such that the flashes produced thereby each has a photographically effective peak of illumination of very small time duration followed by prompt extinguishment, means controlled by the opening of the shutter for momentarily energizing one of the lamps to cause the said one lamp to produce a flash having its peak of illumination at a time before the shutter becomes closed, means responsive to the flash produced by the said one lamp for momentarily energizing another lamp to cause the said other lamp to produce a flash, and means whereby the peak of illumination of the flash of the said other lamp is caused to occur before the shutter becomes closed during the very small time duration of the peak of illumination of the flash of the said one lamp.

28. Apparatus operable with a camera having a normally closed shutter for photographing an object having, in combination, a unit having a normally unenergized flash-lamp for producing a flash when momentarily energized to illuminate the object, the lamp being of a type such that the flashes produced thereby each has a photographically effective peak of illumination of very small time duration followed by prompt extinguishment, the unit having means operable with the opening of the shutter for momentarily energizing the lamp to cause it to produce a flash having its peak of illumination at a time before the shutter becomes closed, and the unit having means for momentarily energizing the lamp to cause it to produce a flash in response to a flash from the flash-lamp of another unit.

29. Apparatus operable with a camera having a normally closed shutter for photographing an object having, in combination, a unit having a normally unenergized flash-lamp for producing a flash when momentarily energized to illuminate the object, the lamp being of a type such that the flashes produced thereby each has a photographically effective peak of illumination of very small time duration followed by prompt extinguishment, the unit having a switch operable with the opening of the shutter for momentarily energizing the lamp to cause it to produce a flash having its peak of illumination at a time before the shutter becomes closed, and the unit having means for momentarily energizing the lamp to cause it to produce a flash in response to a flash from the flash-lamp of another unit.

30. Apparatus operable with a camera having a normally closed shutter for photographing an object having, in combination, a unit having a normally unenergized flash-lamp for producing a flash when momentarily energized to illuminate the object, the lamp being of a type such that the flashes produced thereby each has a photographically effective peak of illumination of very small time duration followed by prompt extinguishment, the unit having means controlled by the opening of the shutter for momentarily energizing the lamp to cause it to produce a flash having its peak of illumination at a time before the shutter becomes closed, and the unit having photosensitive means for momentarily energizing the lamp to cause it to produce a flash in response to a flash from the flash-lamp of another unit.

31. Apparatus operable with a camera having a normally closed shutter for photographing an object having, in combination, a plurality of units each having associated therewith a normally unenergized flash-lamp for producing flashes when momentarily energized to illuminate the object, the lamps being of a type such that the flashes produced thereby each has a photographically effective peak of illumination of very small time duration followed by prompt extinguishment, each unit having means selectively operable with the opening of the shutter for momentarily energizing the lamp associated therewith to cause the said lamp selectively to produce a flash having its peak of illumination at a time before the shutter becomes closed, each unit having means for momentarily energizing the lamp associated therewith to cause it to produce a flash in response to a flash from the lamp associated with another unit, and each unit having means whereby the peak of illumination of the flash produced in response to the action of its energizing means responsive to the flash produced by the said lamp of the said other unit is caused to occur before the shutter becomes closed during the very small time duration of the peak of illumination of the flash produced by the said other lamp of the said other unit.

32. Apparatus operable with a camera having a normally closed shutter for photographing an object having, in combination, a unit having a normally unenergized flash-lamp for producing a flash when momentarily energized to illuminate the object, the lamp being of a type such that the flashes produced thereby each has a photographically effective peak of illumination of very small time duration followed by prompt extinguishment, the unit having a normally ineffective circuit for momentarily energizing the lamp when rendered effective, the unit having means controlled by the opening of the shutter for rendering the circuit momentarily effective to cause the lamp to produce a flash, and the unit having photosensitive means for rendering the circuit effective to cause the lamp to produce a flash in response to a flash from the flash-lamp of another unit.

33. Apparatus of the character described having, in combination, a plurality of portable supports, a flash-lamp carried by each support, means carried by each support for connecting the respective lamps to a source of power, a camera having a shutter, means controlled by the shutter for flashing one of the lamps, and means controlled by the flash of the said one lamp for flashing another lamp.

34. The method of photographing large audiences and like scenes illuminated by artificial light, which comprises preliminarily locating a radiation source, preliminarily distributing about the scene, each in a location to illuminate a desired portion thereof, a plurality of light sources controllable by radiation from such radiation source, at will transmitting radiation from the radiation source and thereby effecting simultaneous illumination of the scene by the several light sources, and simultaneously uncovering a sensitized photographic surface to the scene thus illuminated and thereby photographing the scene.

35. The method of photographing large audiences and like scenes illuminated by artificial light, which comprises preliminarily locating a master light source for illuminating one portion of the scene, preliminarily locating a slave light source, controllable by light from the master light source, in position for receiving light from the master light source and for illuminating another portion of the scene, at will illuminating the master light source and thereby energizing the slave light source for simultaneous illumination of the scene by both light sources, and simultaneously uncovering a sensitized photographic surface to the scene thus illuminated and thereby photographing the scene.

36. A method of photographing an object that comprises locating a radiation source, locating a light source adapted to be illuminated in response to radiation from the radiation source to illuminate the object, transmitting radiation from the radiation source to the light source to illuminate the light source, and exposing a sensitized photographic surface substantially simultaneously with the illumination of the object by the light source.

37. A method of photographing an object that comprises locating a radiation source, locating a light source adapted to be illuminated in response to radiation from the radiation source to illuminate the object, transmitting radiation from the radiation source to the light source to illuminate the light source, and exposing a sensitized photographic surface to the object while illuminated by the light source.

38. Apparatus of the character described having, in combination, a radiation source, a light source for illuminating an object, means responsive to the radiation of the radiation source for illuminating the light source, and means for exposing a sensitized photographic surface substantially simultaneously with the illumination of the object by the light source.

39. Apparatus of the character described for photographing an object having, in combination, a radiation source, a light source for illuminating the object, means responsive to the radiation from the radiation source for illuminating the light source, and means for exposing a sensitized photographic surface to the object while illuminated by the light source.

40. Apparatus of the character described for photographing an object having, in combination, a plurality of light-sources for illuminating the object, means for illuminating one of the light sources, means responsive to the illumination of the said one light source for illuminating another light source at a time when the said one light source is illuminated, and means for exposing a sensitized photographic surface at the said time to the object while illuminated by the said one light source and the said light source.

41. Apparatus of the character described for photographing an object having, in combination, a plurality of light sources for illuminating the object, means for illuminating one of the light sources, a plurality of means, one associated with each of the other light sources, and responsive to the illumination of the said one light source for respectively illuminating the other light sources at a time when the said one light source is illuminated, and means for exposing a sensitized photographic surface at the said time to the object while illuminated by the light sources.

42. A system for use in photographing an object having, in combination, a master unit and one or more physically uninterconnected slave units, the master unit including a wave transmitter and means operable at will to energize the same, each slave unit including a light source for illuminating the object and a receiver responsive to the transmitter to be energized by the transmitted wave for illuminating the light source, and means for exposing a sensitized photographic surface to the object while illuminated by the light source.

43. A system for use in photographing an object having, in combination, a master unit and one or more physically uninterconnected slave units, the master unit including a wave transmitter and means operable at will to energize the same, each slave unit including a light source for illuminating the object and a receiver responsive to the transmitter to be energized by the transmitted wave for illuminating the light source, and means for actuating a camera shutter at a time when the light source is illuminated to uncover to the object while illuminated by the light source a sensitized photographic surface within the camera.

44. A system for photographing an object having, in combination, a master unit including a light source for illuminating the object and control means operable at will to effect energization of the light source, and a slave unit including a light source for illuminating the object and control means physically uninterconnected with the control means of the master unit and comprising means responsive to light from the master-unit-light source for illuminating the slave-unit-light source at a time when the master-unit-light source is illuminated, a camera having a shutter, and means operable at the said time for opening the shutter to uncover to the object while illuminated by the light sources a sensitized photographic surface within the camera.

HAROLD E. EDGERTON.